United States Patent
Danning

(10) Patent No.: US 9,976,297 B2
(45) Date of Patent: *May 22, 2018

(54) ANCHOR FOR SOLAR MODULE

(75) Inventor: Matthew Danning, Oakland, CA (US)

(73) Assignee: SunPower Corporation, San Jose, CA (US)

( * ) Notice: Subject to any disclaimer, the term of this patent is extended or adjusted under 35 U.S.C. 154(b) by 1025 days.

This patent is subject to a terminal disclaimer.

(21) Appl. No.: 13/532,703

(22) Filed: Jun. 25, 2012

(65) Prior Publication Data

US 2013/0340379 A1 Dec. 26, 2013

(51) Int. Cl.
*F24J 2/52* (2006.01)
*E04B 1/38* (2006.01)

(52) U.S. Cl.
CPC .............. *E04B 1/38* (2013.01); *F24J 2/5245* (2013.01); *F24J 2/5254* (2013.01); *F24J 2/5258* (2013.01); *F24J 2/5262* (2013.01); *F24J 2/5264* (2013.01); *F24J 2/5211* (2013.01); *Y02B 10/12* (2013.01); *Y02B 10/20* (2013.01); *Y02E 10/47* (2013.01)

(58) Field of Classification Search
USPC ........ 52/173.3, 582.1, 584.1, 704, 705, 708, 52/126.1, 126.5, 126.6, 126.7; 403/397; 411/175; 136/251; 248/188.1, 188.2, 248/500
See application file for complete search history.

(56) References Cited

U.S. PATENT DOCUMENTS

| 5,862,635 A * | 1/1999 | Linse et al. .................. 52/126.6 |
| 7,406,800 B2 | 8/2008 | Cinnamon et al. |
| 7,592,537 B1 | 11/2009 | West |
| 7,748,175 B2 | 7/2010 | Liebendorfer |

(Continued)

FOREIGN PATENT DOCUMENTS

| JP | 2004-060358 | 2/2004 |
| JP | 2004-300865 | 10/2004 |

(Continued)

OTHER PUBLICATIONS

International Search Report and Written Opinion of the International Searching Authority, PCT Appl. No. PCT/US2013/046994 (dated Sep. 2, 2013), 14 pages.

(Continued)

*Primary Examiner* — Jessica Laux
(74) *Attorney, Agent, or Firm* — Oblon, McClelland, Maier & Neustadt, L.L.P.

(57) ABSTRACT

An anchor for mounting one or more solar modules to a roof is disclosed. The anchor can comprise a clamp body comprising a central surface and a first arm extending from the central surface. The first arm can have a first clamping face. The clamp body can be sized and shaped to receive one or more webs extending from one or more solar modules. The anchor can include a rotatable clamp device coupled to the clamp body, the rotatable clamp device configured to press a first web of the one or more webs against the first clamping face. The anchor can also include a rotatable height adjust- (Continued)

ment member coupled to the rotatable clamp device, the rotatable height adjustment member configured to raise or lower at least the clamp body. The rotatable clamp device and the rotatable height adjustment member can be configured to rotate about the same axis.

21 Claims, 17 Drawing Sheets

(56) References Cited

U.S. PATENT DOCUMENTS

| | | | |
|---|---|---|---|
| 7,832,157 | B2 | 11/2010 | Cinnamon |
| 7,866,098 | B2 | 1/2011 | Cinnamon |
| 7,987,641 | B2 | 8/2011 | Cinnamon |
| 8,109,048 | B2 | 2/2012 | West et al. |
| 8,375,654 | B1 | 2/2013 | West et al. |
| 8,505,864 | B1* | 8/2013 | Taylor et al. ............... 248/237 |
| 2002/0116881 | A1* | 8/2002 | Zimmerman ............... 52/126.6 |
| 2008/0121273 | A1 | 5/2008 | Plaisted et al. |
| 2009/0078299 | A1 | 3/2009 | Cinnamon et al. |
| 2011/0000519 | A1* | 1/2011 | West ............................ 136/244 |
| 2011/0000520 | A1 | 1/2011 | West |
| 2011/0000526 | A1 | 1/2011 | West |
| 2011/0000544 | A1 | 1/2011 | West |
| 2011/0214365 | A1* | 9/2011 | Aftanas ....................... 52/173.3 |
| 2011/0214367 | A1* | 9/2011 | Haddock et al. ........... 52/173.3 |
| 2011/0220180 | A1 | 9/2011 | Cinnamon et al. |
| 2011/0284058 | A1 | 11/2011 | Cinnamon |

FOREIGN PATENT DOCUMENTS

| | | |
|---|---|---|
| JP | 2009-002138 | 1/2009 |
| JP | 2011-106188 | 6/2011 |
| KR | 20-0412251 | 3/2006 |
| KR | 10-2010-0108961 | 10/2010 |
| KR | 10-1056531 | 8/2011 |
| WO | WO 2008-028151 | 3/2008 |

OTHER PUBLICATIONS

International Search Report and Written Opinion of the International Searching Authority, PCT Appl. No. PCT/US2013/046992 (dated Sep. 27, 2013), 17 pages.

* cited by examiner

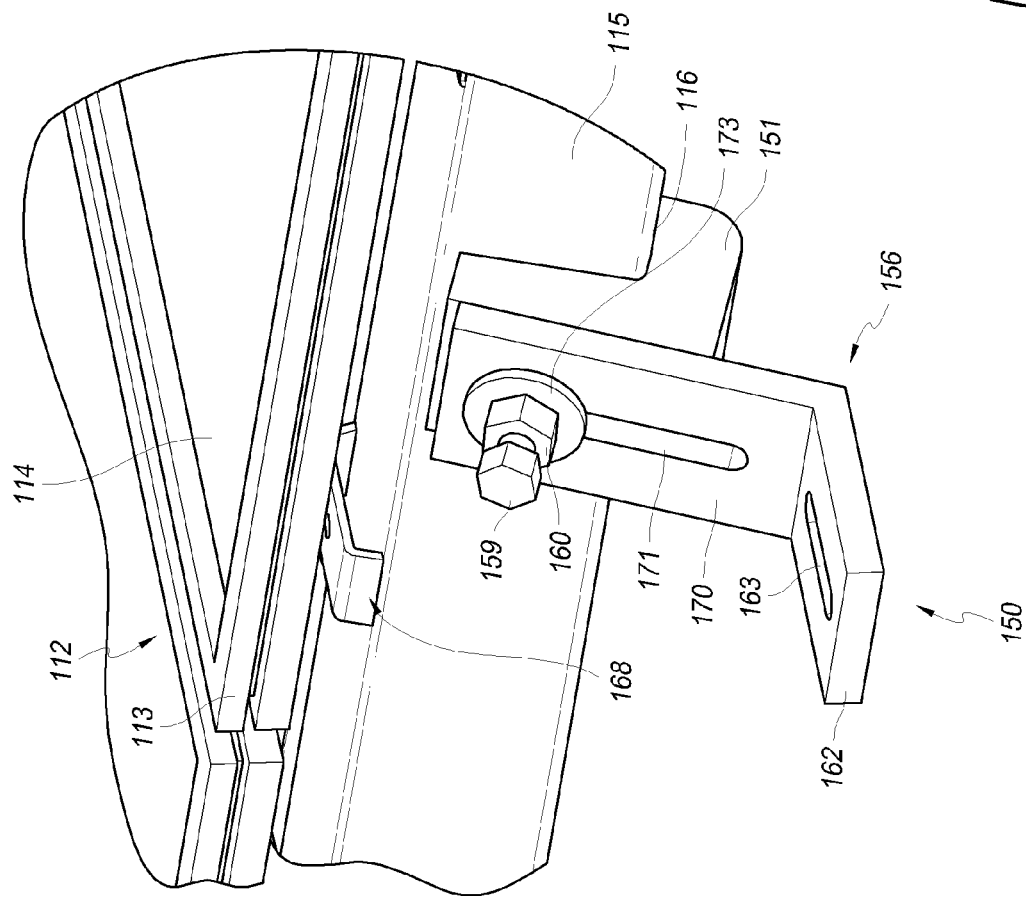

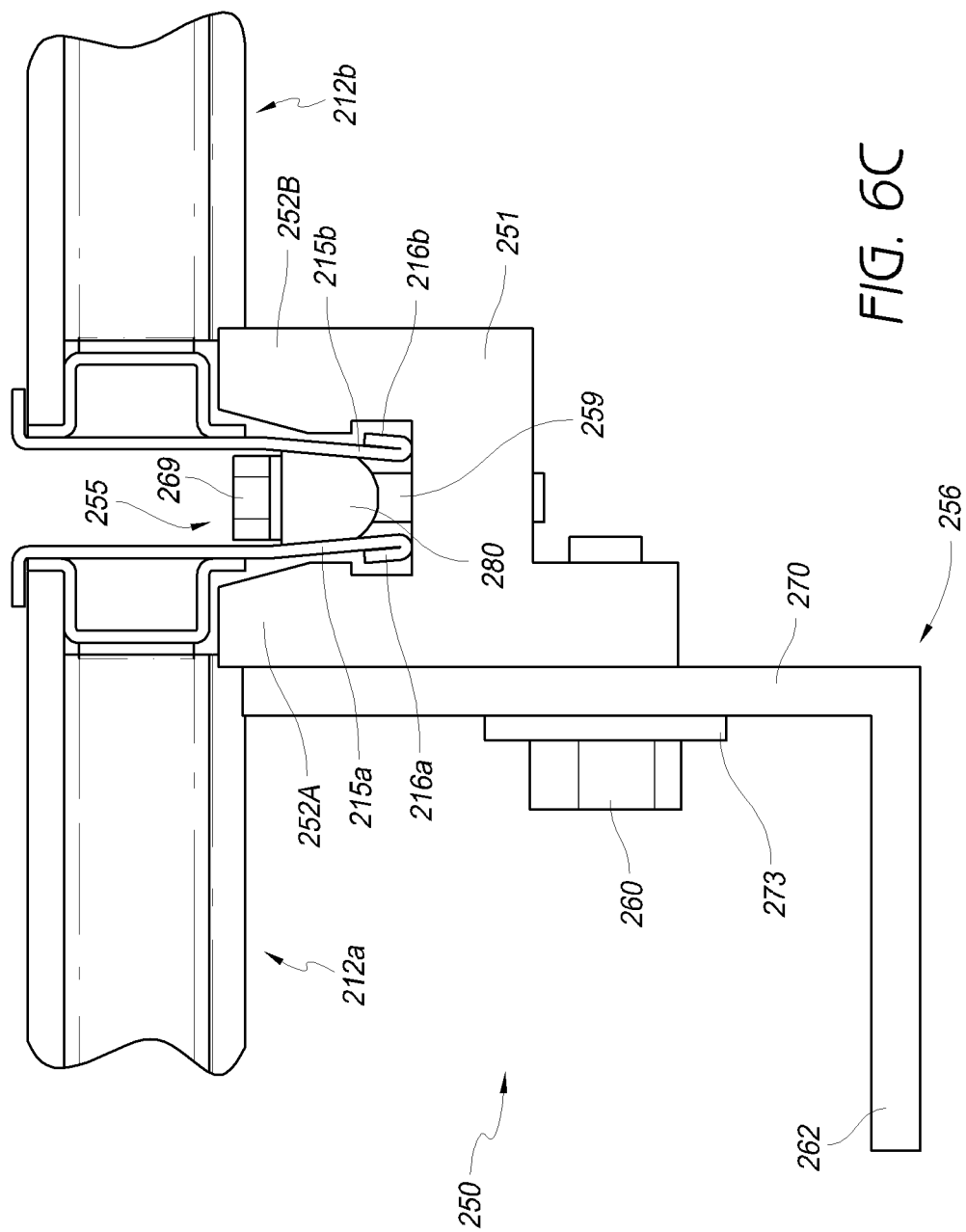

ANCHOR FOR SOLAR MODULE

BACKGROUND OF THE INVENTION

Embodiments of the subject matter described herein relate generally to mounting systems for solar modules, such as anchors for mounting solar modules to a fixed surface such as a roof.

DESCRIPTION OF THE RELATED ART

Solar power has long been viewed as an important alternative energy source. To this end, substantial efforts and investments have been made to develop and improve upon solar energy collection technology. Of particular interest are residential-, industrial- and commercial-type applications in which relatively significant amounts of solar energy can be collected and utilized in supplementing or satisfying power needs. One way of implementing solar energy collection technology is by assembling an array of multiple solar modules.

One type of solar energy system is a solar photovoltaic system. Solar photovoltaic systems ("photovoltaic systems") can employ solar panels made of silicon or other materials (e.g., III-V cells such as GaAs) to convert sunlight into electricity. Photovoltaic systems typically include a plurality of photovoltaic (PV) modules (or "solar tiles") interconnected with wiring to one or more appropriate electrical components (e.g., switches, inverters, junction boxes, etc.).

A typical conventional PV module includes a PV laminate or panel having an assembly of crystalline or amorphous semiconductor devices ("PV cells") electrically interconnected and encapsulated within a weather-proof barrier. One or more electrical conductors are housed inside the PV laminate through which the solar-generated current is conducted.

Regardless of an exact construction of the PV laminate, most PV applications entail placing an array of solar modules at the installation site in a location where sunlight is readily present. This is especially true for residential, commercial or industrial applications in which multiple solar modules are desirable for generating substantial amounts of energy, with the rooftop of the structure providing a convenient surface at which the solar modules can be placed.

As a point of reference, many commercial buildings have large, flat roofs that are inherently conducive to placement of a solar module array, and are the most efficient use of existing space. By contrast, many residential roofs may be sloped or angled such that placement of a solar module may be more difficult due to gravitational forces imposed on the angled modules. While rooftop installation is thus highly variable, it can be important to ensure that the array of solar modules is reliably and stably anchored to the roof, whether the roof is an angled or flat roof. Moreover, it can be important to ensure that a user can easily, effectively, and rapidly mount one or more solar module(s) to the roof.

SUMMARY

In accordance with at least one embodiment, an anchor for mounting one or more solar modules to a roof is disclosed. The anchor can include a clamp body comprising a central surface and a first arm extending from the central surface, the first arm having a first clamping face. In some arrangements, the clamp body can be sized and shaped to receive one or more webs extending from one or more solar modules. The anchor can further include a rotatable clamp device coupled to the clamp body, the rotatable clamp device configured to press a first web of the one or more webs against the first clamping face. In addition, the anchor can comprise a rotatable height adjustment member coupled to the rotatable clamp device, the rotatable height adjustment member configured to raise or lower at least the clamp body. In some embodiments, the rotatable clamp device and the rotatable height adjustment member can be configured to rotate about the same axis.

In another embodiment, a method for securing one or more solar modules to an anchor is disclosed. The anchor can comprise a clamp body having a central surface and a first arm extending from the central surface. In some arrangements, the clamp body can be sized and shaped to receive one or more webs extending from one or more solar modules. In addition, a rotatable clamp device can be coupled to the clamp body. A rotatable height adjustment member can be coupled to the rotatable clamp device. The rotatable clamp device and the rotatable height adjustment member can be configured to rotate about the same axis. The method can comprise positioning a first web against a first clamping face of the first arm. Further, the method can include rotating the rotatable clamp device to press the first web against the first clamping face. The method can also include rotating the rotatable height adjustment member to raise or lower at least the clamp body.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4A is a perspective view of an anchor coupled to a web of a solar module at an outer end of an array, according to another embodiment.

FIG. 6C is a side end view of the anchor of FIG. 5C coupled to two webs of two adjacent solar modules.

DETAILED DESCRIPTION

Figure 1A:
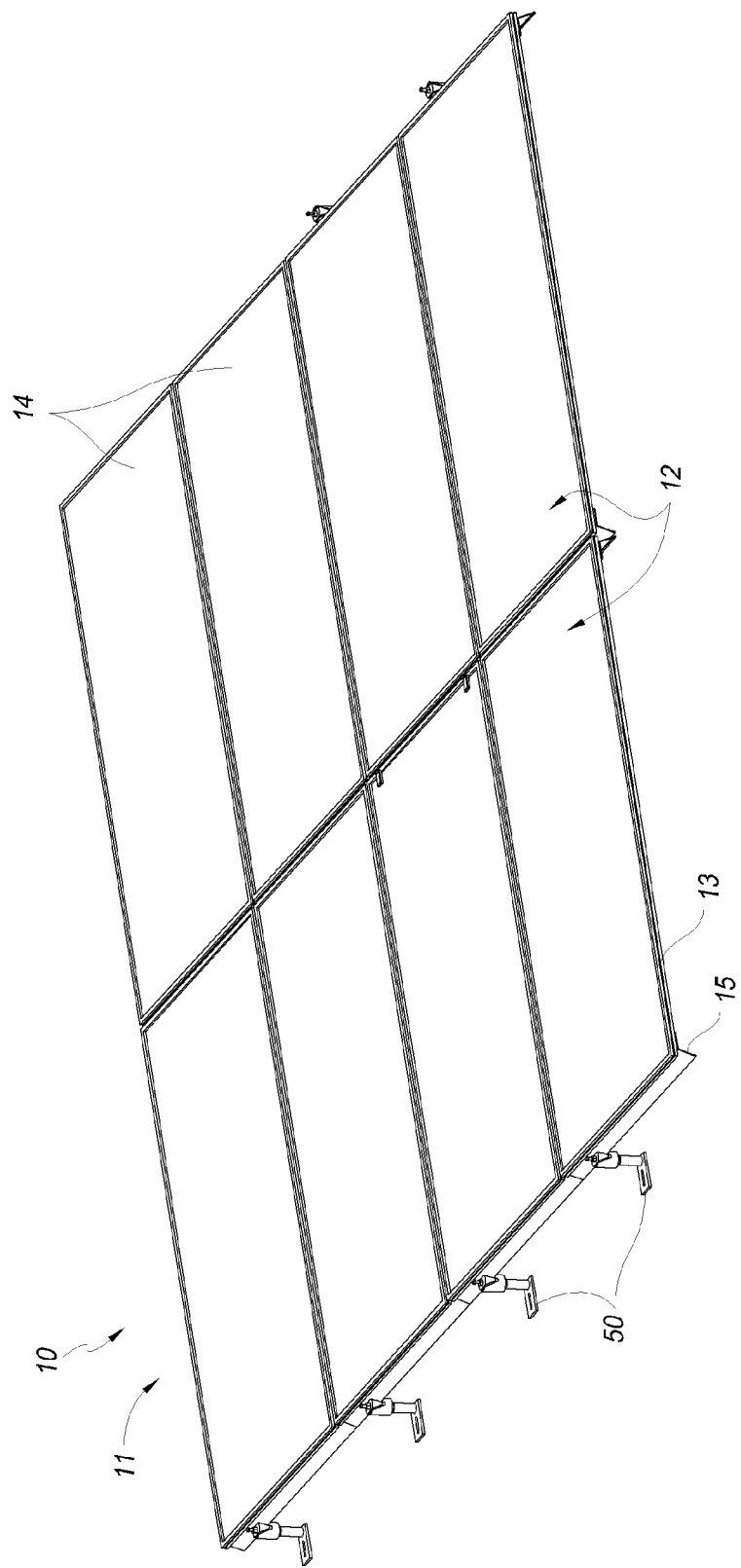
FIG. 1A is a perspective view of a solar power system including a solar array having a plurality of solar modules.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

The inventions disclosed herein are often described in the context of photovoltaic arrays and modules. However, these inventions can be used in other contexts as well, such as concentrated PV systems, thermal solar systems, etc.

Figure 1B:
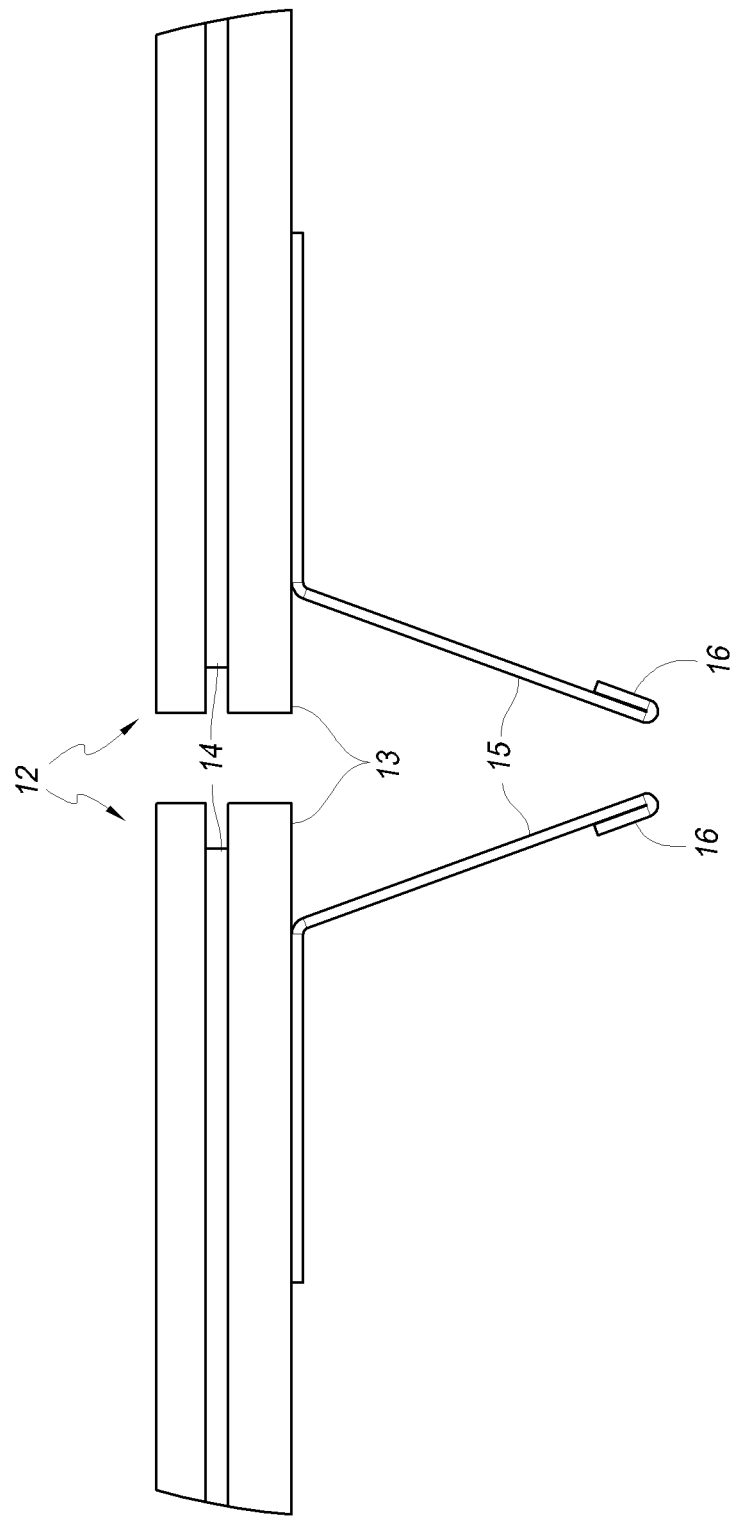
FIG. 1B is an enlarged side end view of two adjacent solar modules, each module having a web extending therefrom.

FIGS. 1A and 1B illustrate a solar power system 10 including a solar array 11 having a plurality of solar modules 12. Each solar module 12 can include a laminate 14 supported by a frame 13. In some embodiments, the solar modules 12 can be the same as or similar to the modules disclosed in U.S. Patent Publication No. 2009/0320908, which is incorporated by reference herein in its entirety for all purposes.

Figure 1C:
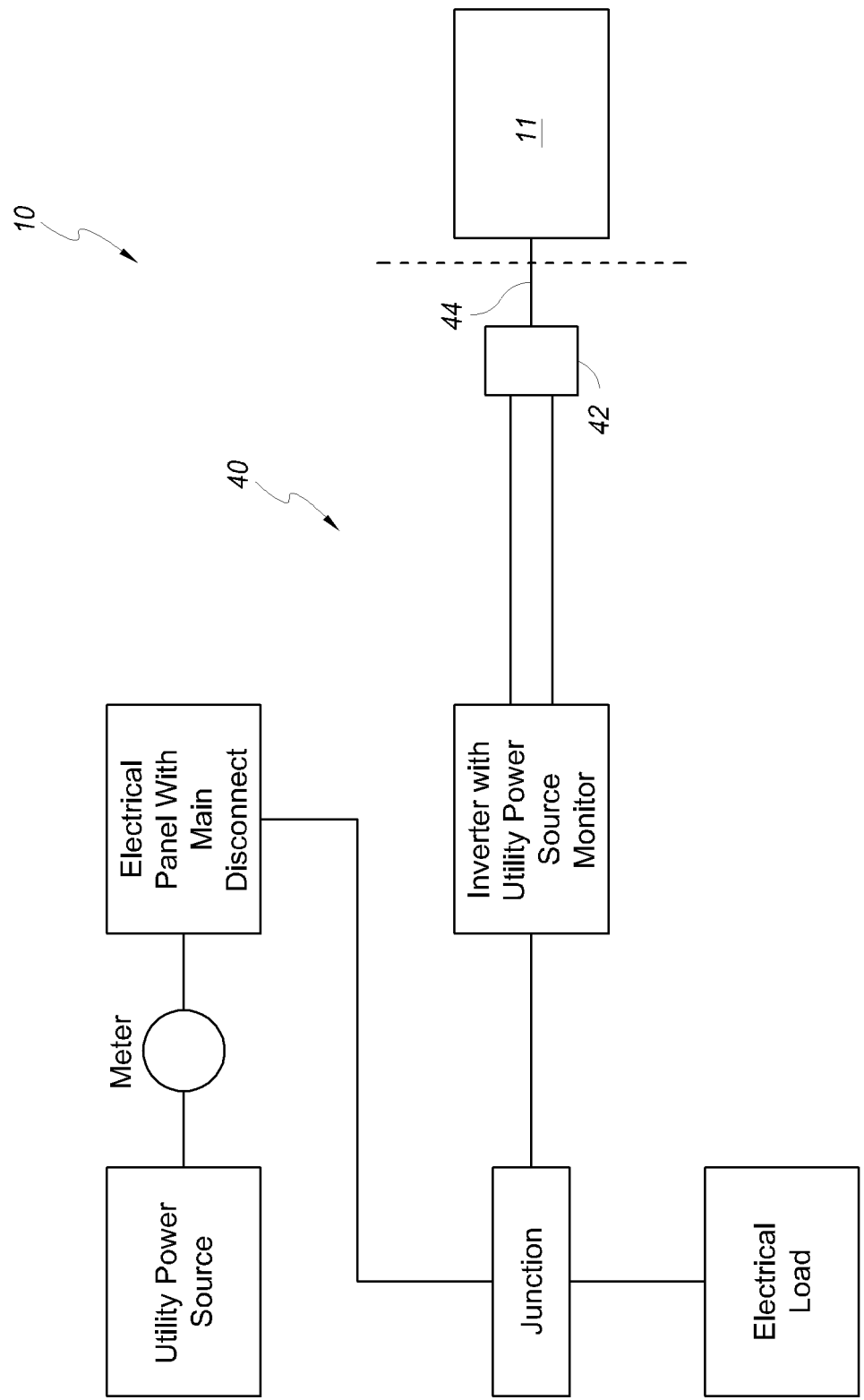
FIG. 1C is a schematic diagram of an optional electrical system connected to the array.

With reference to FIG. 1C, the solar power system 10 can be incorporated into electrical system 40 connected to the array 11. For example, the electrical system 40 can include the array 11 as a power source connected to a remote connection device 42 with power lines 44. The electrical system 40 can also include a utility power source, a meter, an electrical panel with a main disconnect, a junction, electrical loads, and/or an inverter with the utility power source monitor. The electrical system 40 can be configured and can operate in accordance with the descriptions set forth in U.S. Patent Publication No. 2010/0071744, the entire contents of which are hereby expressly incorporated by reference in its entirety for all purposes.

With continued reference to FIGS. 1A and 1B, each laminate 14 can include an array of solar cells, such as PV cells, configured to convert light into electricity. The frame 13 can provide structural support for the corresponding laminate 14 around the peripheral edges of the laminate 14. In some embodiments, the frame 13 can be a separate component that is coupled to the laminate 14.

The modules 12 can include a web 15 extending from or be coupled to an edge of each module 12. For example, FIG. 1B is a magnified side view of two adjacent solar modules 12. As illustrated, the web 15 is coupled to the frames 13 of the two adjacent modules 12. However, other configurations can also be used. For example, the web 15 can be formed integrally or monolithically with the frame 13.

In the illustrated embodiment, the web 15 can extend along the edge of each module 12, and can in some arrangements extend to and/or couple to additional adjacent modules 12. The web 15 can be coupled to the modules 12 by way of an intermediate structure or skeleton. Optionally, the web 15 can include a hem 16 at a distal end of the web 15. As explained in more detail below, the hem 16 can be configured to assist in securing the web 15 to an anchor.

The hem 16 can be formed in any known manner, including for example but without limitation, by folding a portion of the distal end of the web 15 over a 180 degree angle. Optionally, the folded over portion forming the hem 16 can be bonded so as to ensure that the hem 16 remains in the folded state. In some embodiments, the hem 16 can be a separate component that is bonded or otherwise attached to the distal end of the web 15.

The solar modules 12 within the solar array 11 can be mounted to a fixed structure (not illustrated) using one or more anchors 50. For example, the solar modules 12 can be mounted to a roof, which can be angled or substantially flat. The number of anchors 50 used to secure each module can be varied to provide the desired wind lift resistance, based on the weight of the modules 12 and the prevailing wind conditions.

Optionally, the anchors 50 can be configured to provide for vertical adjustment. For example, a user may desire to raise or lower a solar module 12 to ensure that each solar module 12 within the array 11 is aligned or leveled with each another. Such embodiments can make it easier for a user to adjust or set the height of a particular module while simultaneously securing the module to the anchor. Such adjustability can also provide for adjusting the height or angle of the solar modules 12 to maximize the amount of light detected by the module 12.

Figure 2A:
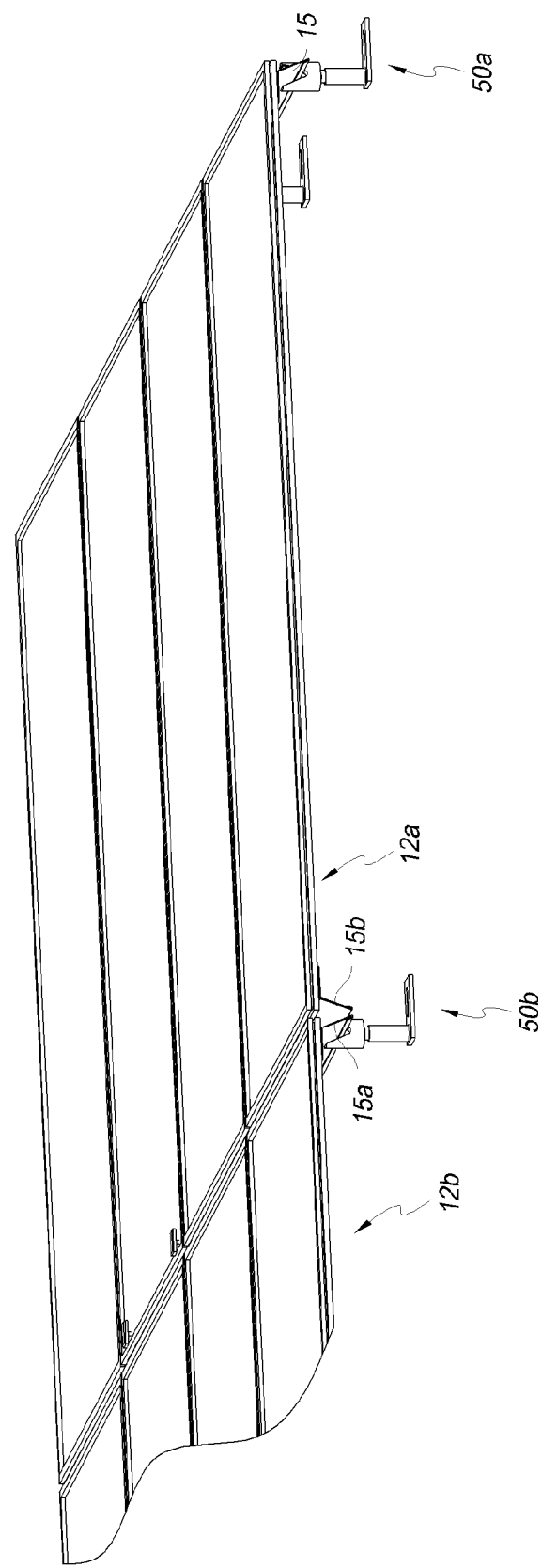
FIG. 2A is a perspective view of a plurality of solar modules coupled to multiple anchors, according to an embodiment.

With reference to FIGS. 2A-2C and FIGS. 3A-3C, multiple solar modules 12 can be secured to corresponding anchors 50a, 50b. As explained above, the anchors 50a, 50b can in turn be mounted to a fixed structure such as a roof (not shown) to thereby secure the modules 12 to the fixed structure. As shown in FIG. 2A, a first anchor 50a can be used to secure a first solar module 12a located at an outer edge of the array 11, to the fixed structure.

In some embodiments, the anchor 50a can be shaped and sized to receive a web 15 extending from the first solar module 12a. Because the particular solar module 12a that is coupled to the anchor 50a is at an outer edge of the array 11, only one web 15 is secured to the anchor 50a (although the anchor 50a can be configured to receive and secure more than one web).

Figure 2B:
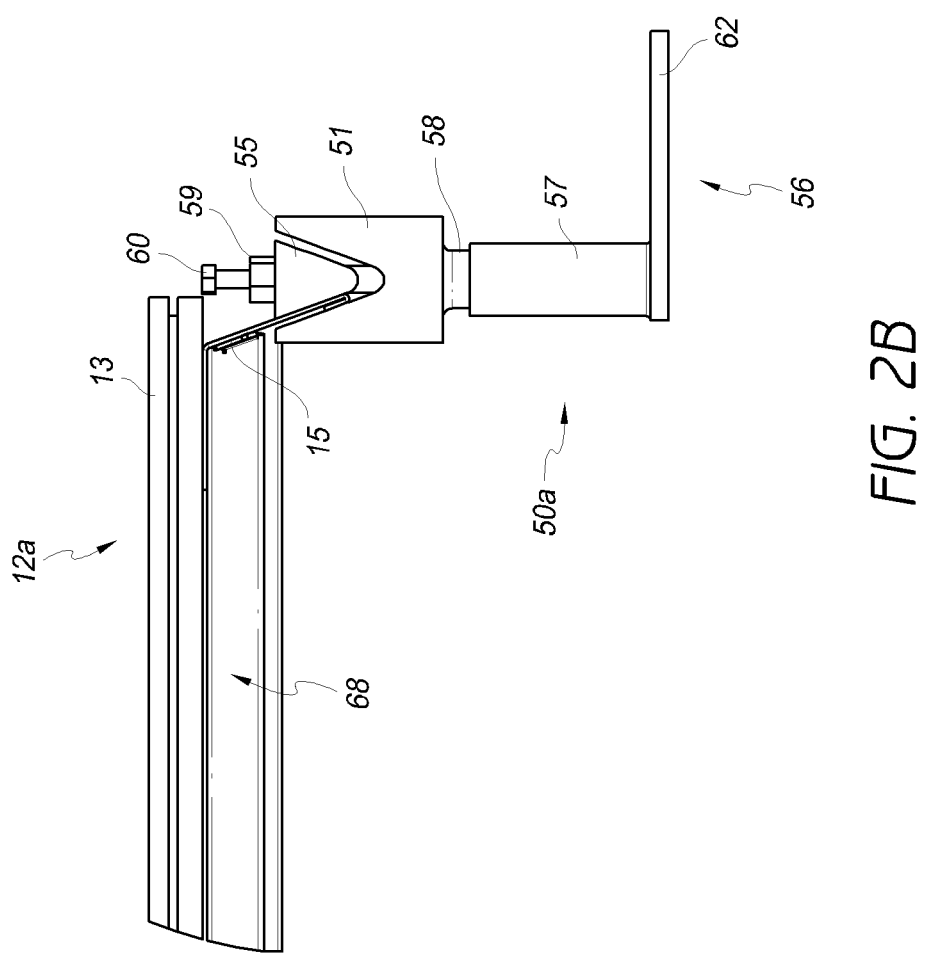
FIG. 2B is a side end view of an anchor coupled to a web of a solar module at an outer edge of the array, according to the embodiment of FIG. 2A.

FIG. 2B is a side end view illustrating the first solar module 12a coupled to the anchor 50a by way of the web 15. The web 15 can be coupled to the first solar module 12a by way of a coupling structure 68 configured to mechanically couple the web 15 to the frame 13. In other embodiments, however, the web can be integrally formed with the first solar module 12a. The web 15 can also comprise a protrusion or attachment extending from the solar module 12a. The components and operation of the anchor 50a are discussed in greater detail below with respect to FIGS. 3A-3C.

A second anchor 50b can also be used to secure the first solar module 12a and, optionally, an adjacent second solar module 12b. The anchor 50b can be located within the interior of the array 11, e.g., such that it couples to two adjacent modules 12a, 12b. In some embodiments, the anchor 50b can be configured to receive two webs 15a, 15b.

Figure 2C:
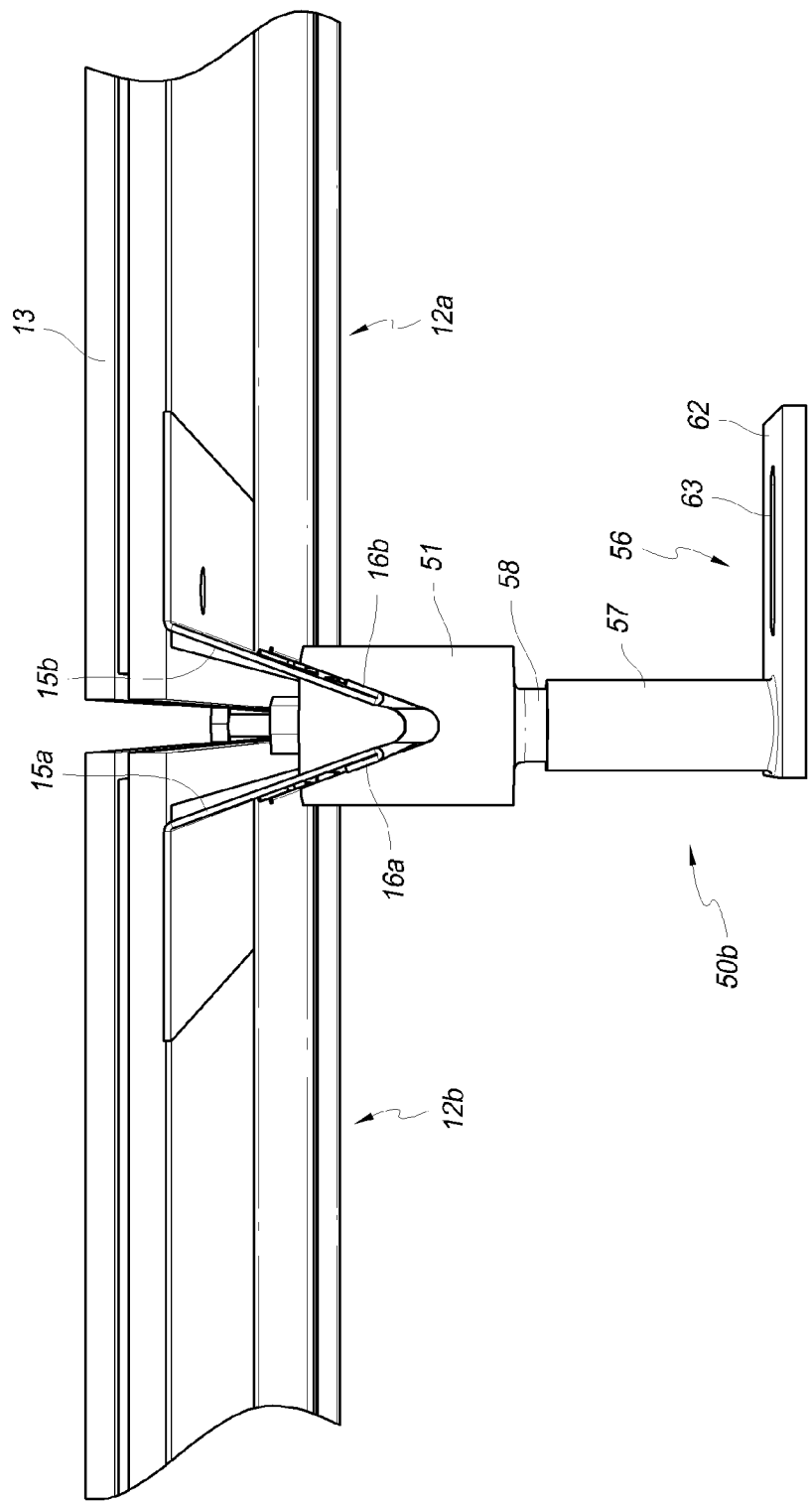
FIG. 2C is a side end view of an anchor coupled to two webs of two adjacent solar modules, according to one embodiment.

FIG. 2C is a side end view illustrating the adjacent solar modules 12a, 12b coupled to the anchor 50b by way of the webs 15a, 15b. In some embodiments, a single anchor 50b can be used to secure two adjacent solar modules to a fixed structure such as a roof.

Figure 3A:
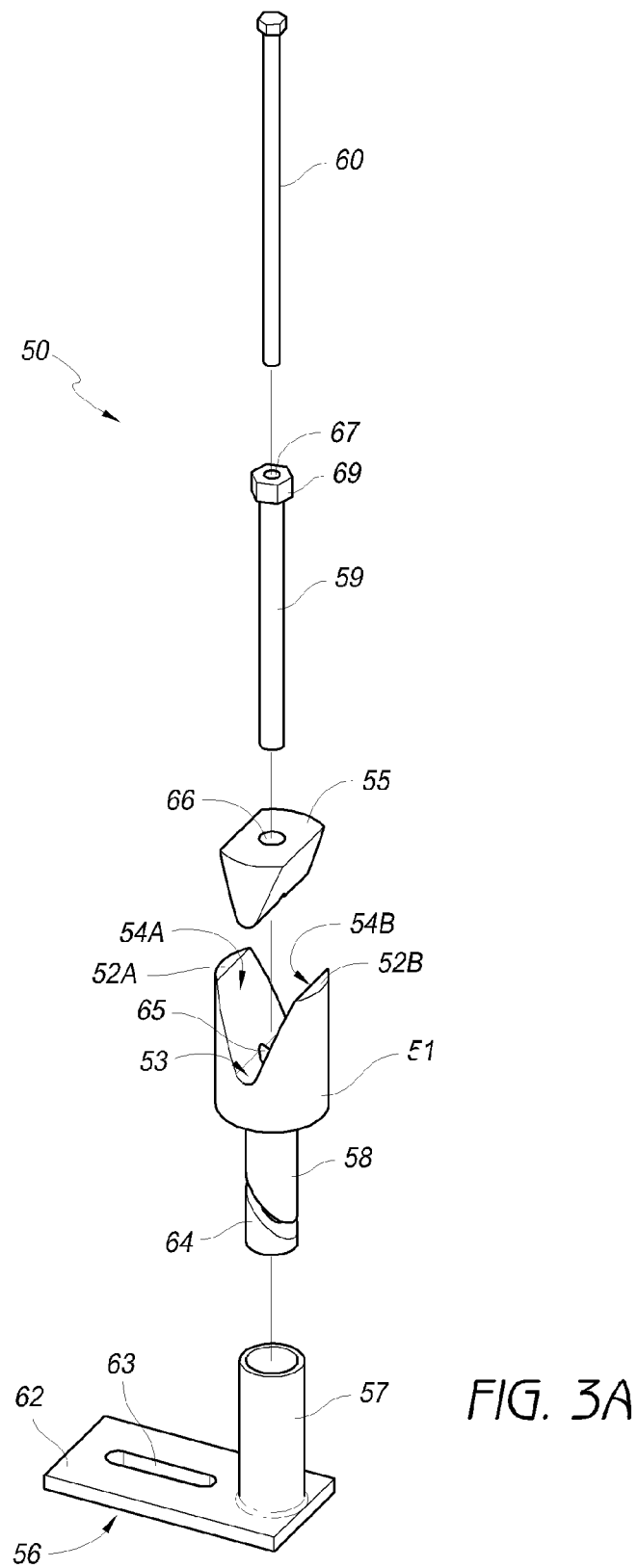
FIG. 3A is a perspective, exploded view of the anchor of the embodiment of FIGS. 2A-2C.
Figure 3B:
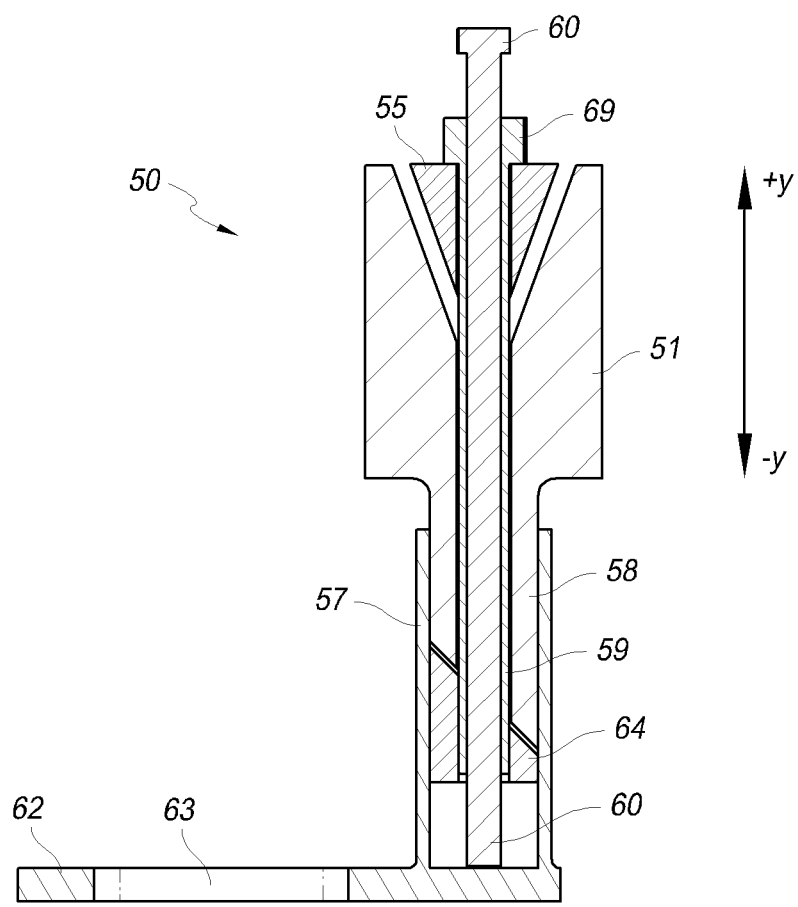
FIG. 3B is a side cross-sectional view of the anchor of FIG. 3A when the anchor is assembled.

FIG. 3A is a perspective, exploded view of the anchor 50, and FIG. 3B is a side cross-sectional view of the anchor 50 of FIG. 3A with the anchor 50 assembled. Note that, as used herein, the components of the anchor 50 will be denoted in increments of 100. Thus, the disclosed embodiments of anchors are be numbered 50, 150, and 250, respectively, and similar or related components of the anchor can likewise be incremented by 100, 200 etc.

Figure 3C:
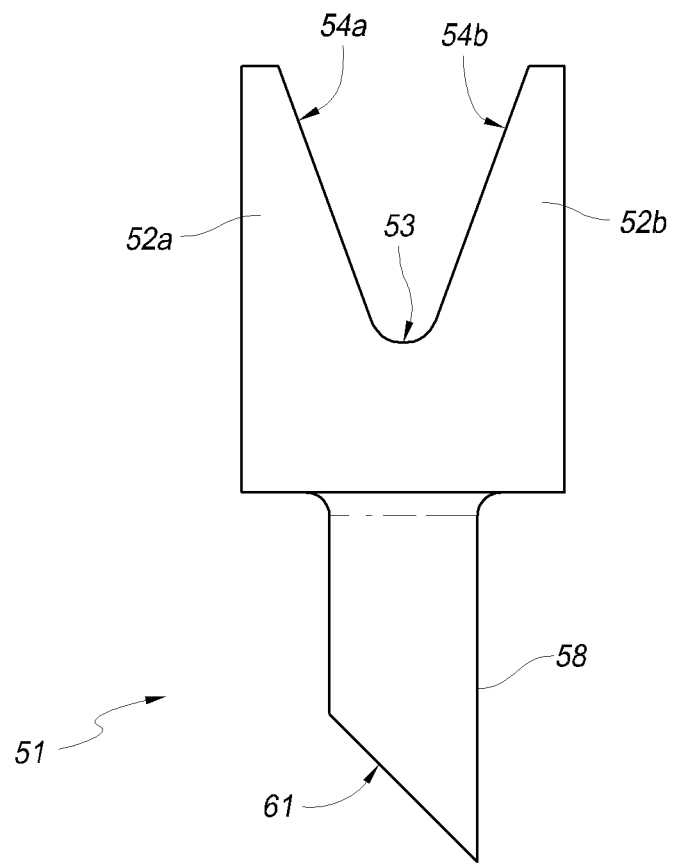
FIG. 3C is a side end view of a clamp body, according to one embodiment.

The anchor 50 of FIGS. 3A-3B can include a clamp body 51. The clamp body 51 is further illustrated, in the side end view, in FIG. 3C. As illustrated in FIGS. 3A-3C, the clamp body 51 can comprise a central surface 53 and one or more arms 52A, 52B extending from the central surface 53. For example, the first arm 52A can include a first clamping face 54A, and the second arm 52B can include a second clamping face 54B. As shown, the clamping faces 54A, 54B can be formed at an angle to the central surface 53 of the clamp body 51. Although FIGS. 3A-3C illustrate a first arm 52A and a second arm 52B, in some embodiments, the clamp body 51 can have only one arm, or more than two arms.

The clamp body 51 can be sized and shaped to receive one or more webs 15 extending from one or more solar modules 12 such that the web(s) 15 can lie in proximity to the clamping face(s) 54A, 54B, as shown in FIGS. 2B-2C. The arms 52A, 52B and their associated clamping faces 54A, 54B can be configured to clamp or press one or more webs 15 of one or more solar modules 12 against the clamp body 51.

Optionally, as explained below with respect to FIGS. 4A-6C, each of the arms 52A, 52B can include a recess sized and shaped to receive a hem formed at the distal end of a web. As with other embodiments, the recess can be configured to receive and/or capture the hem when the web is clamped against a clamping face. The clamp body 51 can also include a hole 64 therethrough. For example, the hole 64 can extend through a length of the clamp body 51. An elongated coupling member 58 can be coupled to and/or integrated with the clamp body 51. As shown, the coupling member 58 can include an angled distal end or face 61.

In addition, the anchor 50 can include a clamp member 55 coupled to the clamp body 51. As shown best in FIG. 3A, the clamp member 55 can be a cap having a hole 66 therethrough. The clamp member 55 can be configured to move towards and away from the clamping faces 54A, 54B of the clamp body 51, e.g. in the +y and −y directions illustrated in FIG. 3B. For example, as the clamp member 55 translates in the −y direction, the clamp member 55 can press a first web 15a against the first clamping face 54A of the first arm 52A and can press a second web 15b against the second clamping face 54B of the second arm 52B, as best seen in FIG. 2C. Alternatively, as shown in FIG. 2B, the clamp member 55 can press only one web 15 against one of the clamping faces of one of the arms. Thus, the downward motion or translation of the clamp member 55 can press or clamp the web(s) 15 to the clamp body 51. The angled configuration of the clamping faces 54A, 54B can advantageously provide effective clamping surfaces when the clamp member 55 translates or moves in the −y direction.

The anchor 50 can further comprise a base member 56 that includes a foot 62 having a slot 63 formed through the thickness of the foot 62. The base member 56 can be coupled to a structure, such as a roof, by bolting, screwing, or otherwise attaching the foot 62 to a surface of the structure through the slot 63. For example, a user can insert a bolt through the slot 63 to engage with a support structure (such as a rafter or stud) coupled to the roof. In addition, the base member 56 can include a receiver 57 configured to receive the coupling member 58 that is coupled to or integrally formed with the clamp body 51.

The receiver 57 can comprise an elongated member having a cavity shaped and sized to receive the coupling member 58. The anchor 50 can further comprise a wedge 64 disposed within the receiver 57 that is configured to engage with the angled distal end 61 of the coupling member 58. The angled face of the wedge 64 can be formed at substantially the same angle as the angled distal end 61 of the coupling member 58, such that the angled face of the wedge 64 interfaces with the angled distal end 61 of the coupling member 58.

As shown in FIGS. 3A-3B, a rotatable clamp device 59 can be coupled to the clamp body 51. In some embodiments, the rotatable clamp device 59 can comprise a clamp bolt that extends through the clamp member 55 (e.g., the cap) and the clamp body 51. For example, the rotatable clamp device 59 can extend through the hole 66 of the clamp member 55 and the hole 65 of the clamp body 51.

The rotatable clamp device 59 can couple to the wedge 64 disposed in the receiver 57 of the base member 56. For example, the rotatable clamp device 59 can include exterior threads at a distal end of the device 59 that threadably couple to corresponding threads in the wedge 64. The rotatable clamp device 59 can also include a head 69 at a proximal end of the device 59 that is configured to bear against the clamp member 55.

Optionally, a rotatable height adjustment member 60 can be coupled to the rotatable clamp device 59. In some embodiments, the rotatable height adjustment member 60 can be a jack screw. For example, the rotatable height adjustment member 60 can be adjustably connected to the rotatable clamp device 59 (e.g., the clamp bolt) so as to be axially adjustable relative to the clamp bolt along a longitudinal axis of the rotatable height adjustment member 60 (e.g., the jack screw). In some embodiments, the rotatable height adjustment member 60 can include exterior threads, and the rotatable clamp device 59 can include interior threads.

The rotatable height adjustment member 60 can threadably connect into a hole 67 formed through the length of the rotatable clamp device 59. In some embodiments, the rotatable height adjustment member 60 can extend past a distal end of the rotatable clamp device 59 and through a hole formed in the wedge 64. A distal end of the rotatable height adjustment member 60 can thereby contact the foot 62 of the base 56 by passing through the rotatable clamp device 59, the clamp member 55, the clamp body 51, the wedge 64, and the receiver 57. Because the rotatable height adjustment member 60 passes through the rotatable clamp device 59 as shown, the rotatable clamp device 59 and the rotatable height adjustment member 60 can be configured to rotate about the same axis of rotation, e.g., the longitudinal axis of both components.

The anchor 50 can be formed of any suitable material. In some embodiments, for example, the components can be formed of a metallic material. For example, any and/or all components of the anchor 50 can be formed of steel. In some embodiments, any and/or all components of the anchor 50 can be formed of aluminum or zinc. Skilled artisans will appreciate that other materials are possible for the anchor.

As explained above with respect to FIGS. 2A-2C, the anchor 50 can be configured to secure one or more webs 15 to a fixed structure such as a roof. In addition, the anchor 50 can be configured to adjust the height of the solar modules 12.

In operation, to clamp one or more webs 15 to the clamp body 51, a user can rotate the rotatable clamp device 59 such that the threads at its distal end advance into the hole formed in the wedge 64. As the rotatable clamp device 59 advances, the head 69 of the rotatable clamp device 59 bears against the clamp member 55, which in turn presses the clamp member 55 against the web(s) 15 of the solar module(s) 12 to secure the module(s) 12 to the anchor 50.

Advantageously, rotating the rotatable clamp device 59 can also assist in securing the clamp body 51 within the receiver 57 of the base member 56, e.g., by securing the clamp body 51 in the y-direction relative to the base member 56. This can be advantageous in securing the components of the anchor 50 together even under vertical, lifting loads such as wind.

For example, as the rotatable clamp device 59 rotates, the wedge 64 can bear against the angled distal end 61 of the coupling member 58. Because the wedge 64 and the angled distal end 61 of the coupling member 58 include faces formed at similar, complementary angles, axial forces induced by threading can be imparted in a radial direction using the angled surfaces. The substantially vertical forces, e.g., in the −y-direction, can be transmitted as a force with a radially outward component by way of the angled faces of the wedge 64 and the angled distal end 61. The induced radial forces can therefore act as an interference fit between the receiver 57 and the coupling member 58 to assist in securing the clamp body 51 to the base member 56 and the fixed structure.

Furthermore, the user can adjust the height of the solar module(s) 12 in addition to securing the module(s) 12 to the fixed structure. To adjust the height, the user can rotate the rotatable height adjustment member 60 (e.g., the jack screw) such that the rotatable height adjustment member 60 bears against the foot 62 of the base member 56. By bearing against the base member 56, the rotatable height adjustment member 60 can raise or lower the clamp body 51, the wedge 64, the clamp member 55, and the rotatable clamp device 59 relative to the base member 56 in order to raise the solar module(s) 12.

Users of the solar power system 10 disclosed in FIGS. 2A-3C can readily secure one or more solar modules 12 to a fixed structure and can adjust the height of the one or more modules 12 using a single anchor 50. The embodiment disclosed in FIGS. 2A-3C can advantageously support the weight of the module(s) 12 while the user secures the module to the anchor and adjusts the height of the clamp body 51 and therefore the total height of the module(s) 12. Indeed, in some situations, the user may be able to adjustably secure the module(s) 12 to the anchor 50 by rotating the rotatable clamp device 59 and the rotatable height adjustment member 60 using only one hand.

In one embodiment of an assembly method, the wedge 64 can be inserted into the receiver 57, and the coupling member 58 of the clamp body 51 can be inserted in the receiver 57 above the wedge 64. The clamp member 55 can be positioned adjacent the central surface 53 of the clamp body 51 between the first and second arms 52A, 52B. The rotatable clamp device 59 can be passed through the clamp member 55 and the clamp body 51. The rotatable height adjustment member 60 can be passed through, or threaded through, the rotatable clamp device 59 past a distal end of the rotatable clamp device 59 to contact the base member 56.

To mount the solar module(s) 12 to the fixed structure such as a roof, base member 56 can be mounted to the fixed structure. The other components of the anchor 50 can be assembled as described above during the mounting process (e.g., while the user is on the roof), or the anchor 50 can be assembled before use in the field. The user can position a first web 15a of a first solar module 12a against the first clamping face 54A of the first arm 52A.

In some embodiments, the user can position a second web 15b of a second solar module 12b against the second clamping face 54B of the second arm 52B. The rotatable clamp device 59 can be rotated to press the first web 15a against the first clamping face 54A of the first arm 52A. The rotation can also press or clamp the second web 15b against the second clamping face 54B of the second arm 52B. In some embodiments, rotating the rotatable clamp device 59 (e.g., the clamp bolt) can cause the clamp member 55 to translate toward the central surface 53 of the clamp body 51. In addition, as explained above, rotating the clamp bolt can also induce a radially outward force against the base member 56 that secures the coupling member 58 within the receiver 57. The rotatable height adjustment member can be rotated to raise or lower at least the clamp body 51 (which can also raise or lower the solar module(s)).

Figure 4B:
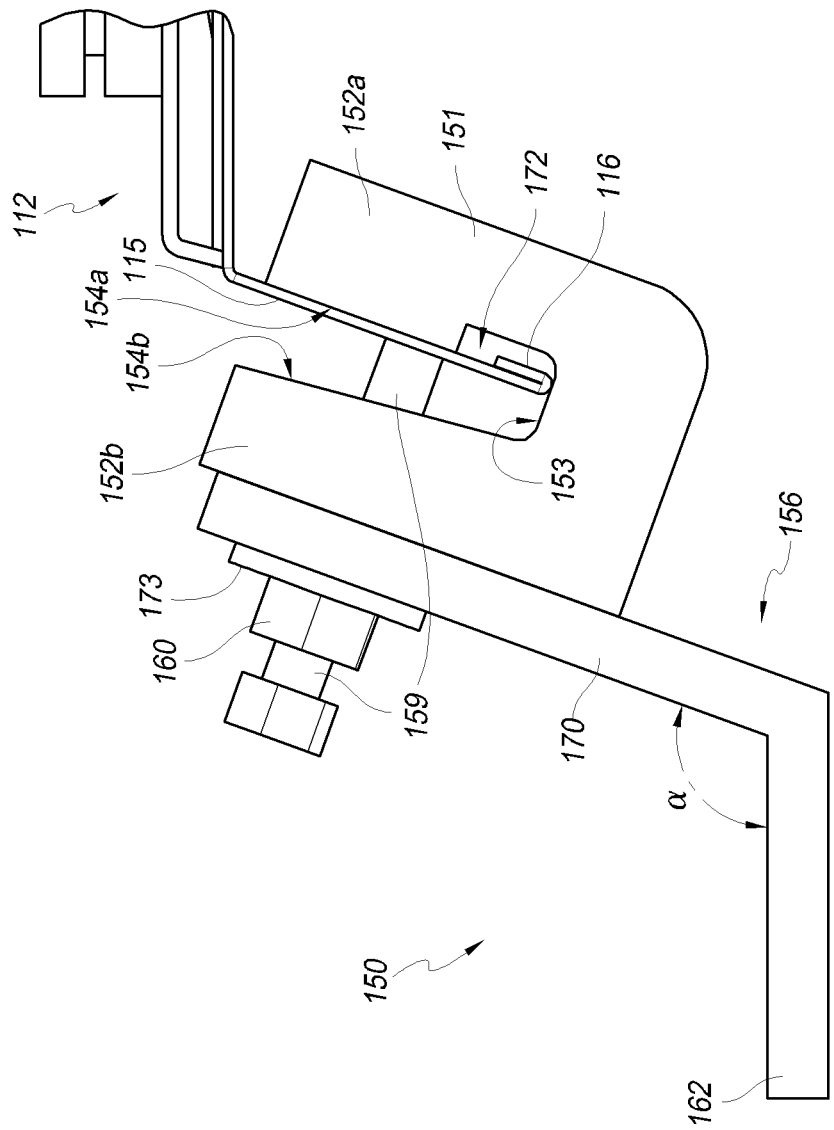
FIG. 4B is a side end view of the anchor and web of FIG. 4A.

FIGS. 4A-4B illustrate another embodiment of an anchor 150. FIG. 4A is a perspective view of the anchor 150 coupled to a web 115 of a solar module 112 at an outer end of an array 111. FIG. 4B is a side end view of the anchor 150 and web 115 of FIG. 4A. As above, the anchor 150 can be configured to secure one or more webs 115 to the anchor 150, including, e.g., webs of adjacent modules 112 in the interior of an array 111.

The anchor 150 can comprise a clamp body 151 having a central surface 153 and at least a first arm 152A extending therefrom. A second arm 152B can also extend from the central surface 153.

Each arm can include a clamping face 154A, 154B, as explained above. In addition, each clamping face 154A, 154B can include a recess 172 sized and shaped to receive a hem 116 formed at or near a distal end of the web(s) 115. Further, the recess 172 can be configured to capture the hem 116 of a web 115 when the web 115 is clamped against the body 151. When captured as such, the recess can provide enhanced retaining function because if the web 115 begins to slip upwardly, the hem 116 eventually contacts the upper edge of the recess 172, thereby additionally resisting further upward movement of the web 115 away from the anchor 150. As illustrated, the recess 172 is formed only in clamping face 154A; it should be appreciated, however, that the recess 172 can be formed in both clamping faces 154A, 154B.

The anchor 150 can further comprise a base member 156 (or roof mount) having a first wall 170 and a second wall or foot 162 joined at an angle α to the first wall 170. As illustrated in FIG. 4B, the angle α can be greater than 90 degrees in some embodiments. In other embodiments, the angle α can be about 90 degrees, while in still other embodiments, α can be less than 90 degrees.

For example, if the web 115 is formed at an angle to the roof or structure, then the first and second walls 170, 162 can correspondingly be joined at an angle such that the web 115 can be received by the clamp body 151 while ensuring that the solar modules 112 remain substantially parallel to the roof or structure.

The foot or second wall 162 can include a first slot 163 formed therethrough. As in the embodiment of FIGS. 2A-3C, a bolt or other coupling member can operatively join to the roof or fixed structure through the first slot 163. The first wall 170 can include a second elongated slot 171 extending therethrough.

The anchor 150 can further comprise a clamp member 159, which can be a rotatable clamp device, such as a clamp bolt. The clamp member 159 can couple to the clamp body 151 by extending through the second elongated slot 171 and a hole within the clamp body 151 (not illustrated). A distal end of the clamp member 159 can be configured to press the web 115 of the module 112 against the clamping face 154A to secure the module 112 to the anchor 150. In some embodiments, the clamp member 159 (e.g., rotatable clamp device) can be threaded through the hole in the clamp body 151 to press against the web 115. Alternatively, a nut or other component (not illustrated) can be mounted on the clamping face 154B of the second arm 152B to bear against the clamping face 154B to cause the clamp member 159 to press against the web 115.

As in the embodiment of FIGS. 2A-3C, the solar modules 112 can be both secured to corresponding anchors 150 and height-adjusted. For example, the anchor 150 can optionally include a rotatable height adjustment member 160 coupled to the clamp member 159, e.g., the rotatable clamp device, such that the rotatable height adjustment member 160 can be adjusted relative to the clamp member 159. In some implementations, the rotatable height adjustment member 160 can comprise a nut. However, other height adjustment mechanisms can also be used.

The clamp member 159 can extend through the rotatable height adjustment member 160 such that the clamp member 159 (e.g., the clamp bolt) and the rotatable height adjustment member 160 (e.g., the nut) are configured to rotate about the same axis. In some embodiments, the clamp member 159 is threaded through the rotatable height adjustment member 160 such that rotation of the rotatable height adjustment member 160 can cause a washer 173 and the first wall 170 to engage or disengage from the second arm 152B.

When the second arm 152B has been loosened or disengaged, the second arm 152B can be translated along the second elongated slot 171 to raise or lower the rotatable height adjustment member 160, the clamp member 159, the clamp body 151, the web 115, and, thus, the solar module(s) 112. When the height adjustment member 160 is at the desired height, the second arm 152B can be tightened or engaged by rotating the adjustment member 160 in a direction opposite the direction used to disengage the second arm 152B.

As explained above, the clamp member 159 can press the web(s) 115 against the clamping face 154A of the first arm 152A. As shown in FIG. 4B, for example, when the web 115 is pressed against the clamping face 154A, the hem 116 can be urged into the recess 172. The recess 172 can be sized and shaped such that the hem 116 is captured within the recess when the hem 116 is pressed or urged into the recess 172. For example, while the clamp member 159 clamps the web 116 by pressing it against the clamping face 154A, the recess 172 can assist in securing the module 112 to the anchor 150 by preventing or inhibiting vertical motion by the web 115, e.g., motion parallel to the clamping face 154A that might otherwise allow the web 115 to slide out of the clamp. The recess 172 can therefore assist in retaining the web within the anchor 150 when the web 115 is clamped against the clamp body 151.

In one method for mounting the solar module(s) 112 to a fixed structure, the base member 156 (or roof mount) can be coupled to the fixed structure or roof. A web 115 can be positioned against a first clamping face 154A of the first arm 152A. The rotatable clamp device or clamp member 159 can be rotated to press the web 115 against the first clamping face 154A. The rotatable height adjustment member 160, or nut, can be rotated to raise or lower the clamp body 151 and the solar module(s) 112. In some embodiments, a second web can be pressed against the second clamping face 154B of the second arm 152B. Further, the rotatable height adjustment member 160 can be rotated and translated along the slot 171 to raise or lower the clamp body and the solar module(s) 112. Moreover, in some embodiments, the clamp member 159 can contact the web 115 to clamp the web 115 against the first clamping face 154A. The hem can be positioned in the recess 172 formed in the first clamping face 154A to secure the web 115 to the anchor 150.

Figure 5A:
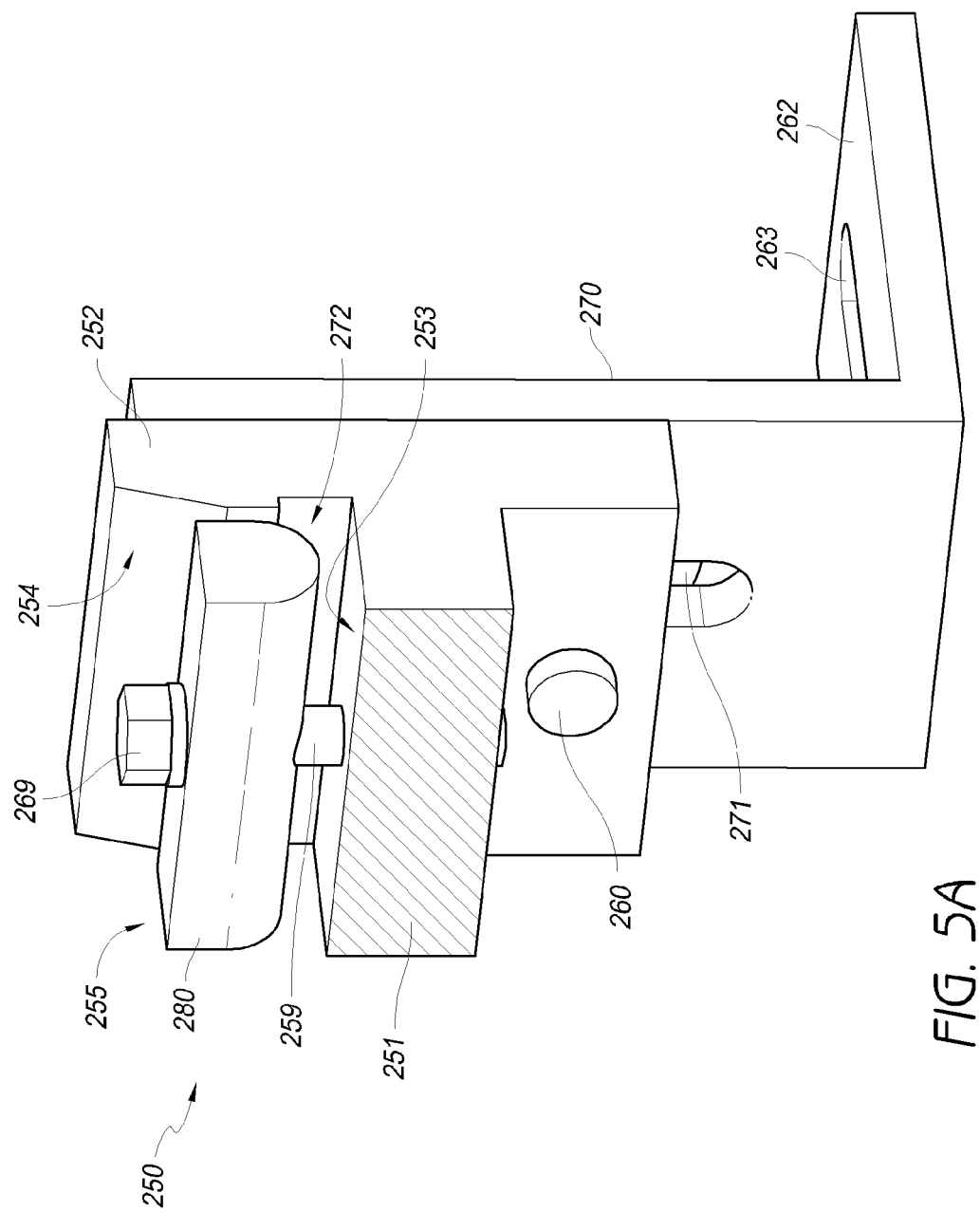
FIG. 5A is a perspective view of an anchor, according to yet another embodiment.
Figure 5B:
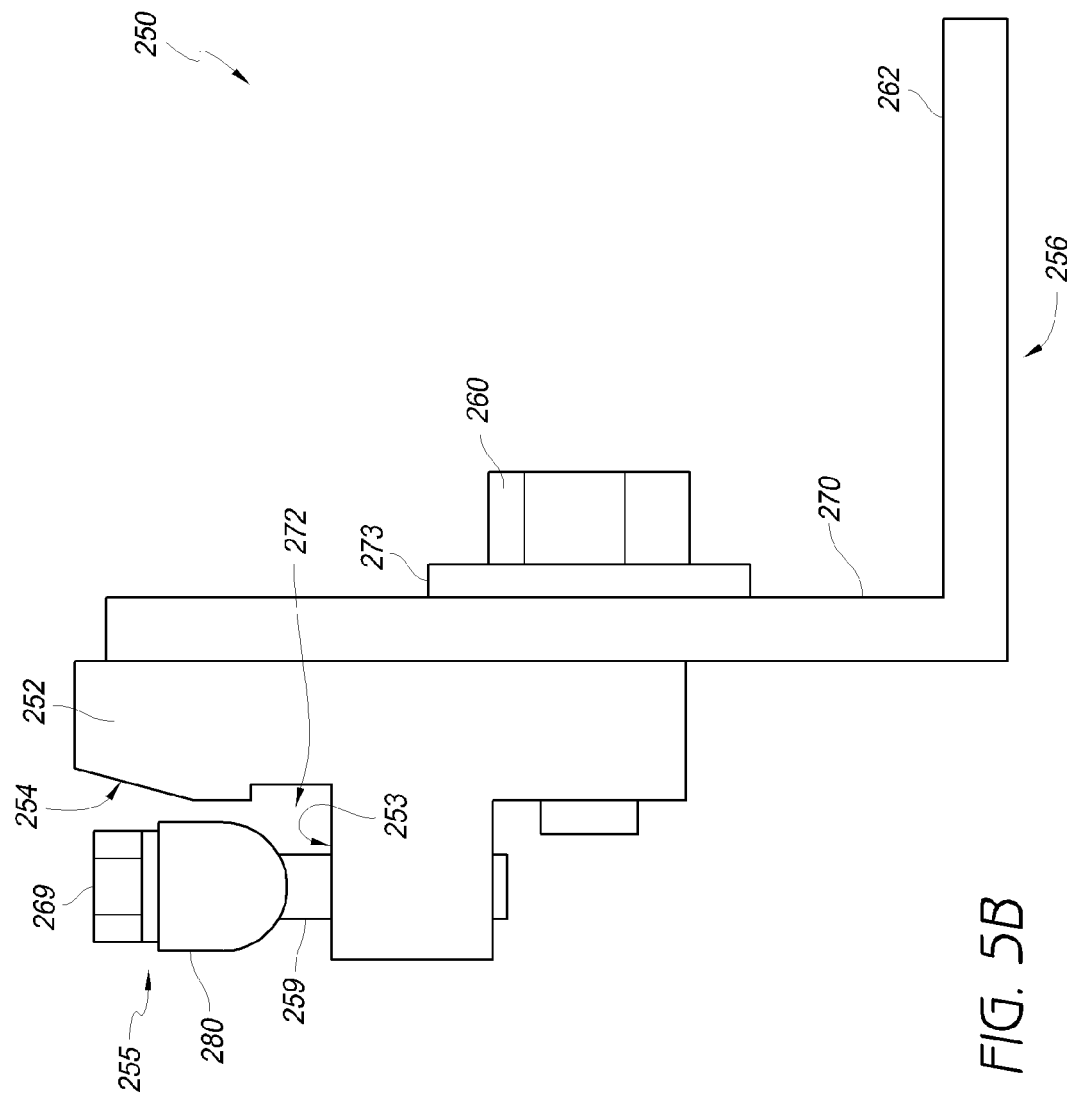
FIG. 5B is a side end view of the anchor of FIG. 5A.
Figure 5C:
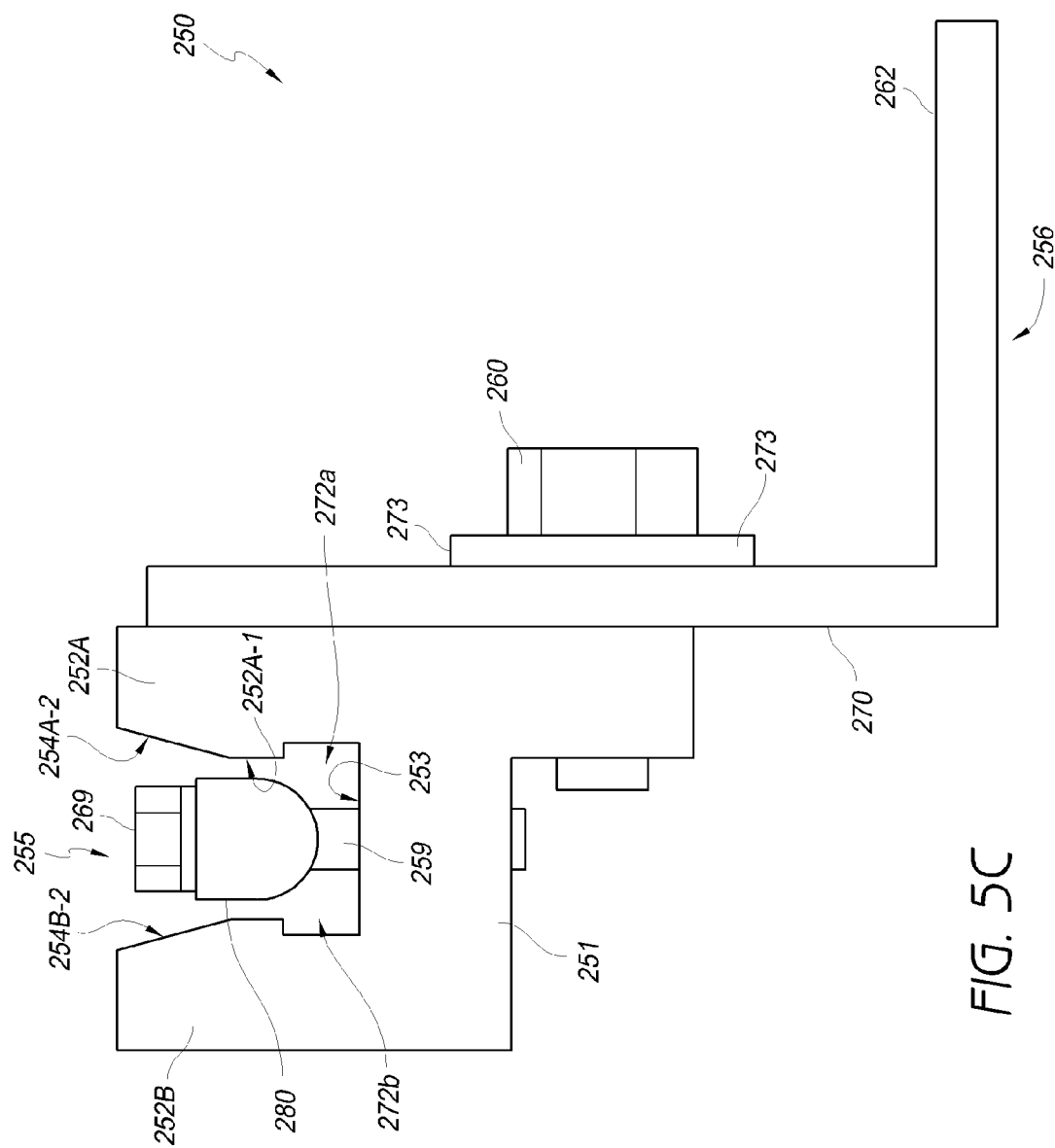
FIG. 5C is a side end view of an anchor according to another embodiment.

With reference to FIGS. 5A-6C, another embodiment of an anchor 50 is identified by the reference numeral 250. The anchor 250 can comprise a clamp body 251 having a central surface 253. As shown in FIGS. 5A-5B, a single arm 252 can extend from the central surface 253 in one embodiment. In other embodiments, such as in FIGS. 5C and 6A-6C, a first arm 252A and a second arm 252B can extend from the central surface 253. In some embodiments, each arm 252A, 252B can include a clamping face 254A, 254B.

Each clamping face 254A, 254B can include a first surface 254A-1, 254B-1 that is substantially perpendicular to the central surface 253. A second surface 254A-2, 254B-2 can be angled away from the central surface 253 and the first surface 254A-1, 254B-1. The angled surfaces of the clamping faces 254A, 254B can assist in urging the hem(s) 216 into corresponding recess(es) 272A, 272B.

The anchor 250 can comprise a clamp member 255 coupled to the clamp body 251 so as to be moveable toward the clamping face(s) 254A, 254B. The clamp member 255 can be configured to clamp one or more webs 215 against the clamping face(s) 254A, 254B of the clamp body 251.

Figure 6A:
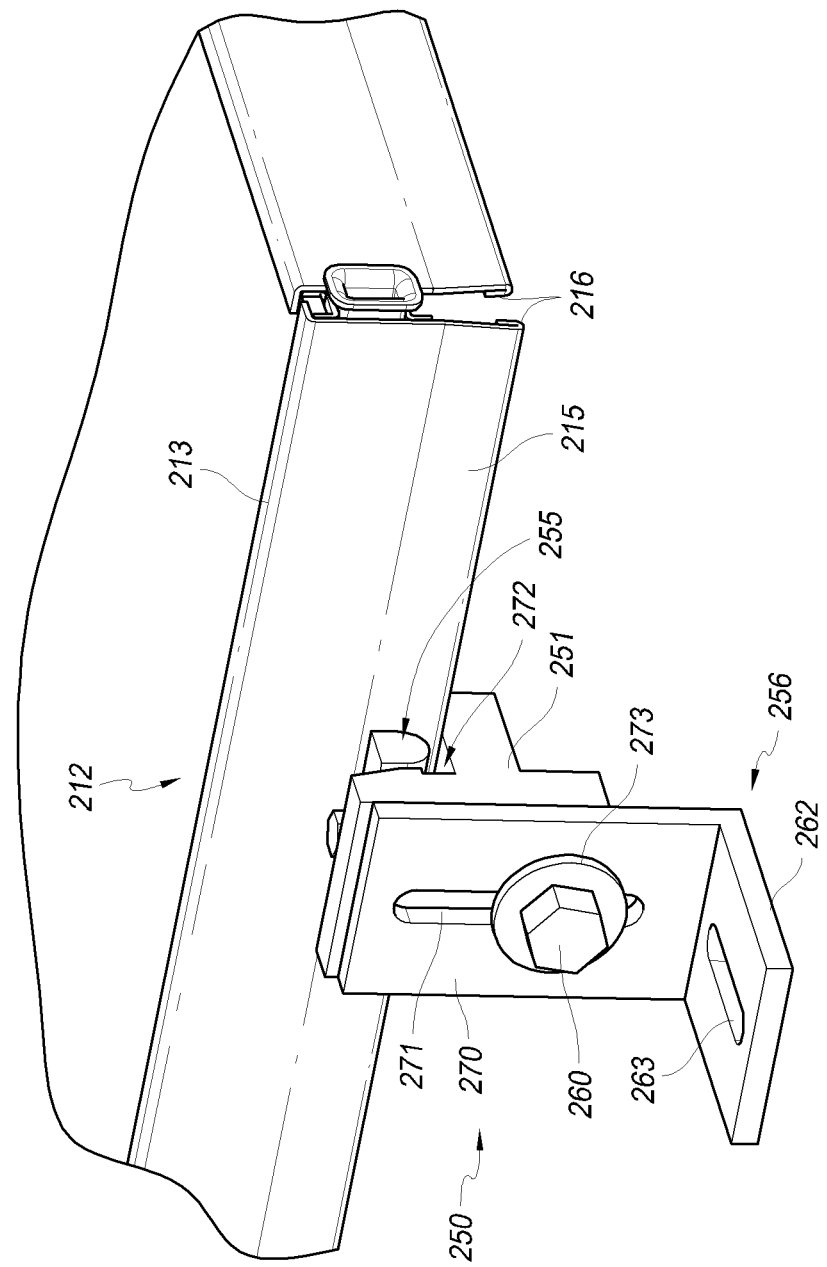
FIG. 6A is a perspective view of the anchor of FIG. 5C coupled to a web of a solar module.
Figure 6B:
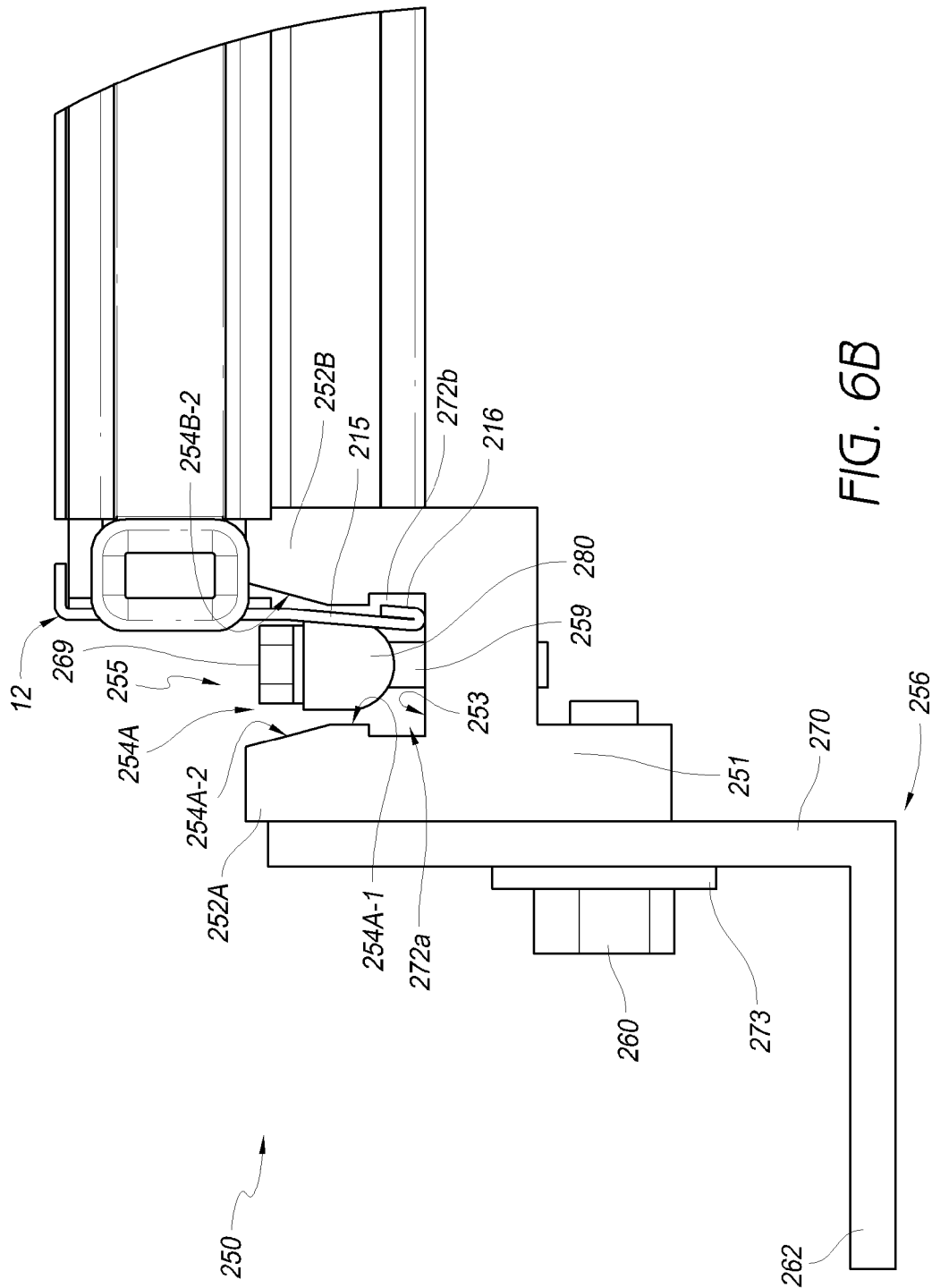
FIG. 6B is a side end view of the anchor and web of FIG. 6A.

As shown in FIGS. 6A-6B, the anchor 250 can couple to a solar module 212 at an outer edge of the array 211. Thus, the clamp member 255 of the anchor 250 illustrated in FIGS. 6A and 6B can press one web 215 of the solar module 212 against the second clamping face 254B of the second arm 252B. However, the clamp member 25 of the anchor 250 can also be configured to press two webs 215a, 215b against the first and second clamping faces 254A, 254B, respectively. For example, as described in the above embodiments of FIGS. 2A-4B, the anchor 250 can be configured to couple to the webs of two adjacent solar modules 212a, 212b that may be located in the interior of the array 211.

The clamp member 255 can further comprise a contact member 280 disposed between the first arm 252A and the second arm 252B. Alternatively, in arrangements with a single arm, the contact member 280 can be disposed adjacent the single arm. A fastener 259 can couple the contact member 280 to the central surface 253 of the clamp body 251. The fastener 259 can include a head 269 such that, when the head 269 is rotated, the fastener 259 rotates and bears against the contact member 280. For example, in some implementations, the fastener 259 can threadably engage with the clamp body 251. The contact member 280 can thus be advanced toward the central surface 253 of the clamp body 251 and can press the one or more web(s) 215 against the clamping face(s) 254.

As explained above with respect to FIGS. 2A-4B, the hem 216 of each web 215 can be received and captured by the corresponding recess 272 when the web 215 is clamped against the clamping face(s) 254. For example, as the fastener 259 advances the contact member 280 against the web 215, the hem 216 of the web 215 can be urged into the recess 272. The recess 272 can thereby further secure the web 215 to the anchor 250 by inhibiting vertical motion, e.g., motion parallel to the clamping faces 254, of the web 215 relative to the clamp body 251.

The anchor 250 can further comprise a roof mount or base member 256 that has a first wall 270 and a foot or second wall 262 joined at an angle to the first wall 270. The foot 262 can include a first slot 263 configured to couple to a roof or fixed structure, as explained with respect to the embodiment of FIGS. 4A-4B. The first wall 270 can include a second elongated slot 271.

A rotatable height adjustment member 260, e.g., a bolt, can extend through the second elongated slot 271 and a hole (not shown) in the clamp body 251. For example, the rotatable height adjustment member 260 can threadably engage with the hole of the clamp body 251. As in FIGS. 4A-4B, rotation of the bolt in one direction can cause a washer 273 to disengage or loosen from the clamp body 251. The bolt or rotatable height adjustment member 260 can then be translated along the second elongated slot 271 to raise or lower the clamp body 251, the web(s) 215, and, thus, the solar module(s) 212.

To secure one or more solar module(s) 212 to a fixed structure such as a roof, the roof mount or base member 256 can be mounted to the roof or structure. A first web 215a can be positioned against the first clamping face 254A of the first arm 252A of the clamp body 251 (or alternatively the second clamping face 254B). The clamp member 255 can be advanced to contact the clamp member 255 against the first web 215a to clamp the first web 215a against the first clamping face 254A. For example, the fastener 259 can be rotated to translate the clamp member 255 (e.g., the contact member 280) toward the clamp body 251.

The first hem 16a of the first web 215a can be positioned or urged into the first recess 272A to secure the first web 215a to the anchor 250. Furthermore, the rotatable height adjustment member 260 can be rotated and translated along the second elongated slot 271 to raise or lower at least the clamp body 251, and therefore, the solar module(s) 212.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An anchor for mounting one or more solar modules to a roof, the anchor comprising:
   a clamp body comprising a central surface and a first arm extending from the central surface, the first arm having a first clamping face, the clamp body sized and shaped to receive one or more webs extending from one or more solar modules;
   a rotatable clamp device coupled to the clamp body, the rotatable clamp device configured to press a first web of the one or more webs against the first clamping face when the rotatable clamp device is rotated about a rotational axis; and
   a rotatable height adjustment member coupled to the rotatable clamp device, the rotatable height adjustment member configured to raise or lower at least the clamp body and the one or more solar modules when the rotatable height adjustment member is rotated about the same rotational axis as the rotatable clamp device.

2. The anchor of claim 1, further comprising:
   a second arm extending from the central surface opposite the first arm, the second arm having a second clamping face, and
   wherein the rotatable clamp device is further configured to press a second web of the one or more webs against the second clamping face.

3. The anchor of claim 2, the anchor further comprising:
   a base member comprising a first wall and a second wall joined at an angle to the first wall, wherein the first wall includes an elongated slot, and wherein the second wall is configured to mount to a roof,
   wherein the rotatable clamp device comprises a bolt extending through the clamp body and the elongated slot, the bolt configured to press the first web against the first clamping face.

4. The anchor of claim 3, wherein the rotatable height adjustment member comprises a nut, wherein the bolt extends through the nut, and wherein rotation of the nut and translation of the nut along the slot raises or lowers at least the clamp body.

5. The anchor of claim 2, wherein the clamp body further comprises a coupling member, the anchor further comprising a base member having a receiver configured to receive the coupling member.

6. The anchor of claim 5, wherein the receiver comprises an elongated member, and wherein the base member further comprises a foot extending from the elongated member, the foot having a slot configured to couple the anchor to a roof.

7. The anchor of claim 5, wherein the rotatable clamp device comprises a clamp bolt that extends through a cap and the clamp body.

8. The anchor of claim 7, wherein the rotatable height adjustment member comprises a jack member threaded through the clamp bolt and extending past a distal end of the clamp bolt to contact the base member.

9. The anchor of claim 8, wherein rotation of the jack member causes the jack member to bear against the base member to raise or lower at least the clamp body.

10. The anchor of claim 8, wherein the coupling member comprises an angled distal face, the anchor further comprising a wedge disposed within the receiver that engages the angled distal face of the coupling member.

11. The anchor of claim 10, wherein rotation of the clamp bolt causes the wedge to bear against the angled distal face of the coupling member to induce a radially outward force against the base member that secures the coupling member within the receiver.

12. The anchor of claim 10, wherein rotation of the clamp bolt causes the cap to bear against the clamp body to press the first web against the first clamping face and to press the second web against the second clamping face.

13. A method for securing one or more solar modules to an anchor, the anchor comprising a clamp body having a central surface and a first arm extending from the central surface, the clamp body sized and shaped to receive one or more webs extending from one or more solar modules, wherein a rotatable clamp device is coupled to the clamp body, wherein a rotatable height adjustment member is coupled to the rotatable clamp device, wherein the rotatable clamp device and the rotatable height adjustment member are configured to rotate about the same axis, the method comprising:
    positioning a first web against a first clamping face of the first arm;
    rotating the rotatable clamp device about a rotational axis to press the first web against the first clamping face; and
    rotating the rotatable height adjustment member about the rotational axis to raise or lower at least the clamp body.

14. The method of claim 13, wherein the anchor comprises a second arm extending from the central surface opposite the first arm, the second arm having a second clamping face, wherein rotating the rotatable clamp device presses a second web against the second clamping face of the second arm.

15. The method of claim 14, the anchor further comprising a coupling member, a base member having a receiver that receives the coupling member, wherein the rotatable clamp device comprises a clamp bolt that extends through a cap and the clamp body, wherein the rotatable height adjustment member comprises a jack member threaded through the clamp bolt and extending past a distal end of the clamp bolt to contact the base member, the method comprising rotating the jack member to raise at least the clamp body.

16. The method of claim 15, further comprising coupling the base member to a roof to secure the anchor to the roof.

17. The method of claim 15, wherein the coupling member comprises an angled distal face, the anchor further comprising a wedge disposed within the receiver of the base member that engages the angled distal face of the coupling member, the method further comprising rotating the clamp bolt to press the first web against the first clamping face and to press the second web against the second clamping face.

18. The method of claim 17, wherein rotating the clamp bolt induces a radially outward force against the base member that secures the coupling member within the receiver.

19. The method of claim 13, wherein the anchor comprises a base member comprising a first wall and a second wall joined at an angle to the first wall, wherein the first wall includes an elongated slot, wherein the second wall is configured to mount to a roof, and wherein rotating the rotatable clamp device comprises rotating a bolt extending through the clamp body and the elongated slot to press the first web against the first clamping face and the second web against the second clamping face.

20. The method of claim 19, wherein the rotatable height adjustment member comprises a nut, wherein the bolt extends through the nut, the method further comprising translating the nut along the elongated slot to raise or lower at least the clamp body.

21. An anchor for mounting one or more solar modules to a roof, the anchor comprising:
    a clamp body comprising a central surface and a first arm extending from the central surface, the first arm having a first clamping face, the clamp body sized and shaped to receive one or more webs extending from one or more solar modules;
    a rotatable clamp device coupled to the clamp body, the rotatable clamp device configured to press a first web of the one or more webs against the first clamping face; and
    a rotatable height adjustment member coupled to the rotatable clamp device, the rotatable height adjustment member providing for fixation of the one or more solar modules at a plurality of heights,
    wherein the rotatable clamp device and the rotatable height adjustment member are configured to rotate about the same axis.

* * * * *